US006169856B1

(12) United States Patent
Sakamoto et al.

(10) Patent No.: US 6,169,856 B1
(45) Date of Patent: Jan. 2, 2001

(54) CAMERA

(75) Inventors: Takamasa Sakamoto, Sakai; Akio Kimba, Suita; Junichi Tanii, Izumi, all of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/296,576

(22) Filed: Apr. 22, 1999

(30) Foreign Application Priority Data

Apr. 24, 1998 (JP) .................................................. 10-114769

(51) Int. Cl.⁷ ...................................................... G03B 17/00
(52) U.S. Cl. ........................... 396/111; 396/272; 396/358; 396/447
(58) Field of Search .................................. 396/272, 358, 396/385, 386, 447, 111

(56) References Cited

U.S. PATENT DOCUMENTS

| 4,314,747 | * | 2/1982 | Haraguchi et al. | 396/111 |
| 4,348,088 | * | 9/1982 | Yamamichi et al. | 396/358 |
| 4,427,277 | * | 1/1984 | Haraguchi | 396/111 |
| 4,498,750 | * | 2/1985 | Suzuki et al. | 396/272 |
| 4,941,010 | * | 7/1990 | Aihara et al. | 396/111 |
| 5,604,554 | * | 2/1997 | Kirigaya | 396/386 |

FOREIGN PATENT DOCUMENTS 9-049959  2/1997  (JP) .

* cited by examiner

Primary Examiner—W. B. Perkey
(74) Attorney, Agent, or Firm—Morrison & Foerster, LLP.

(57) ABSTRACT

A single lens reflex camera provided with a focus detection unit 58 arranged so as to have a photoreceptive surface disposed adjacent to an aperture 53a provided in the bottom wall 53 of a mirror box, and further provided with a cover 60 for effectively closing the aperture 53a during exposure.

10 Claims, 7 Drawing Sheets

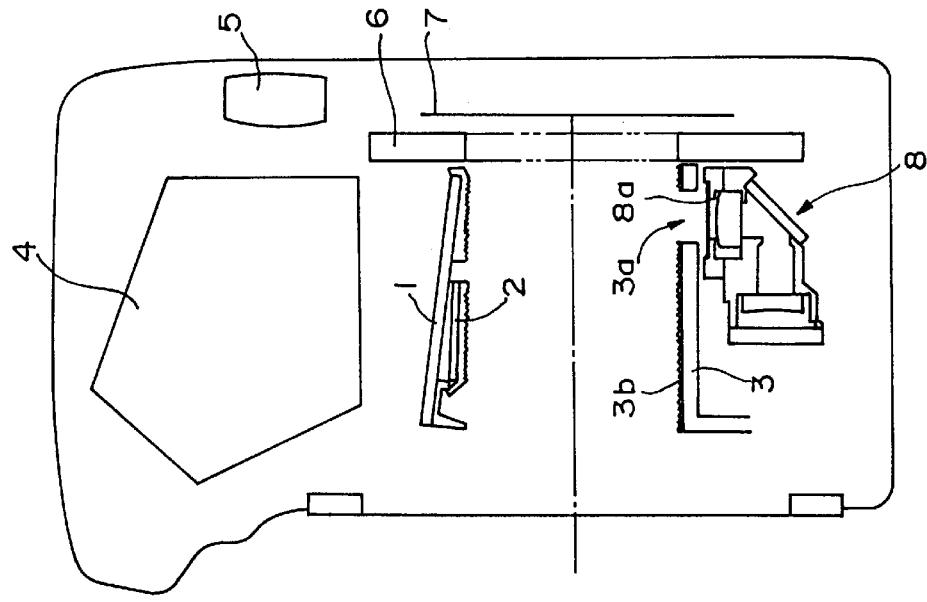
Fig.1 (b) PRIOR ART
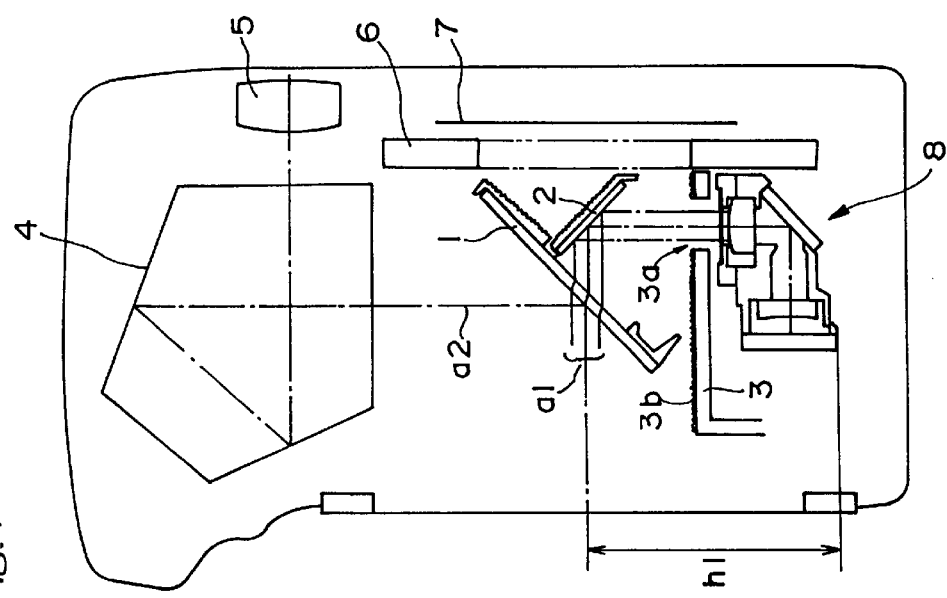
Fig.1 (a) PRIOR ART

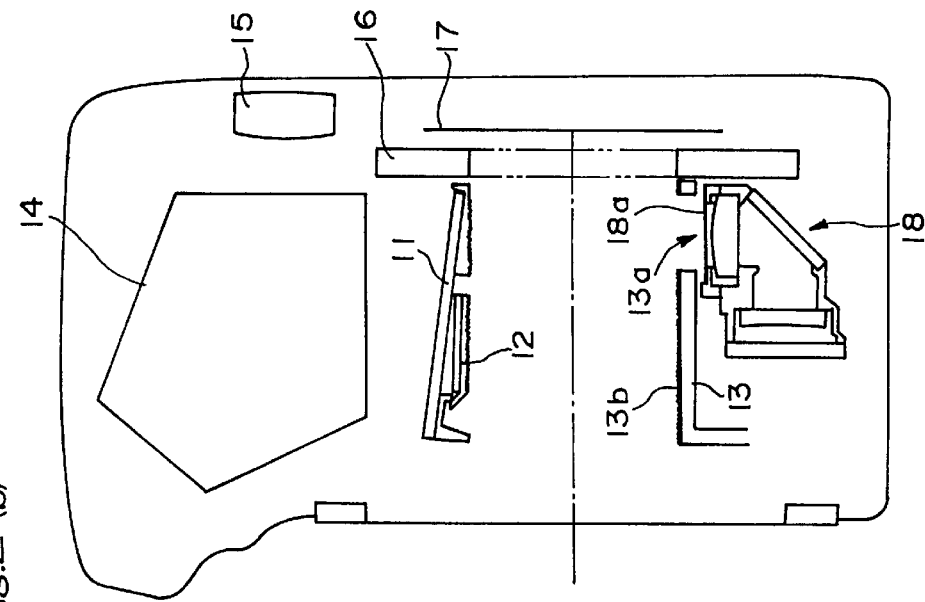
Fig.2 (a) PRIOR ART
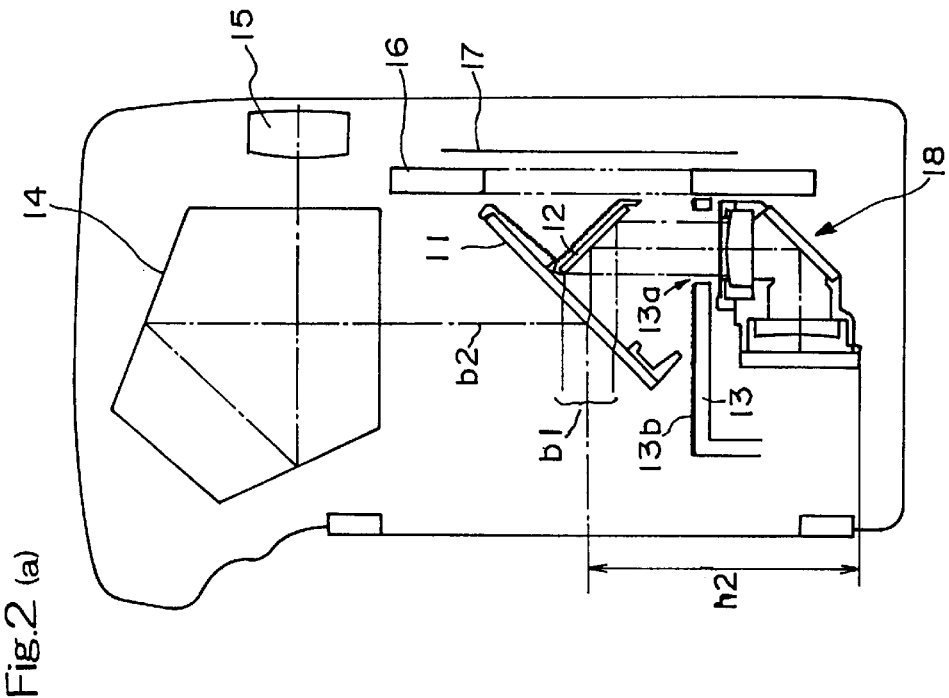
Fig.2 (b) PRIOR ART

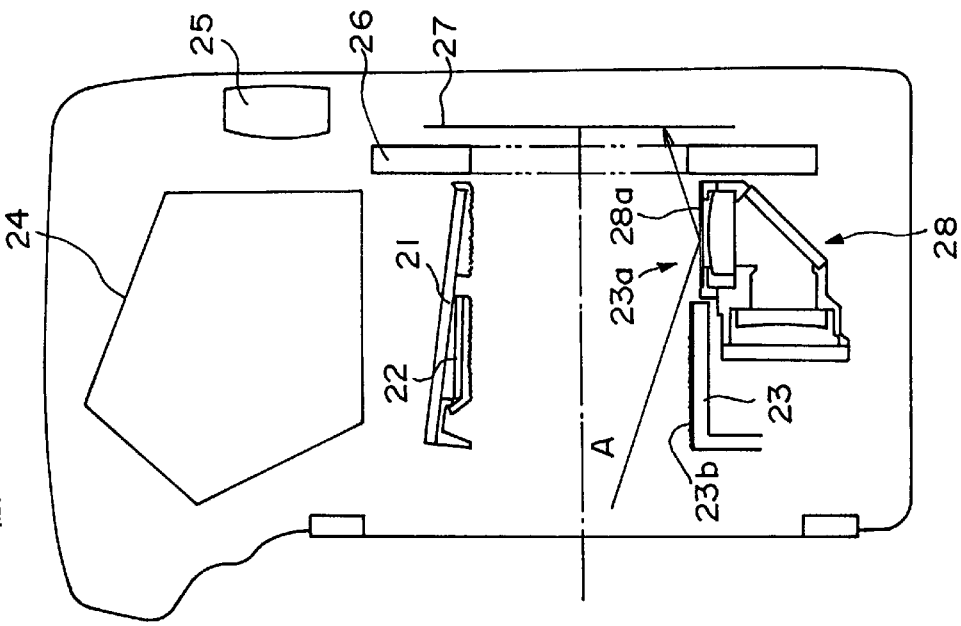
Fig.3 (a) PRIOR ART
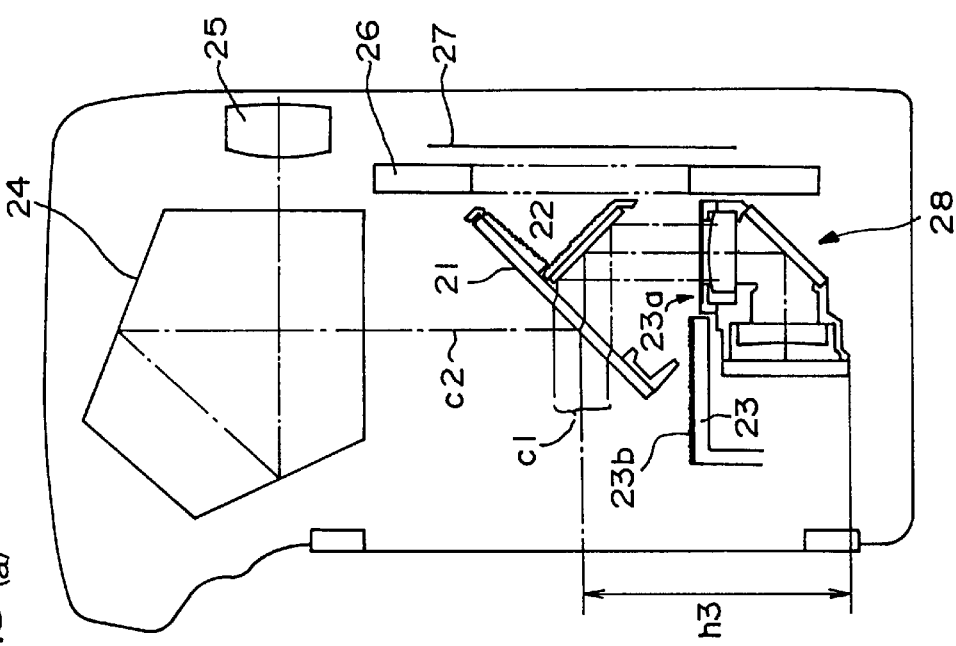
Fig.3 (b) PRIOR ART

PRIOR ART

CAMERA

This application is based on Application No. HEI 10-114769 filed in Japan, the content of which is hereby incorporated by reference.

BACKGROUND OF THE INVENTION

1. Field of the Invention

The present invention relates to a camera, and more specifically relates to a camera provided with a detecting or measuring unit for receiving light through an opening or an aperture provided on a wall.

2. Description of the Related Art

A center vertical cross section view of a conventional single lens reflex camera is shown in FIGS. 1(a) and 1(b). FIG. 1(a) shows the focus detection condition, in which light flux a1 transmitted through the half mirror portion of a main mirror 1 is reflected by a sub-mirror 2, passes through an aperture 3a provided on the bottom wall 3 of a mirror box, and is directed to a focus detection unit (autofocus (AF) module) 8. On the other hand, viewing light flux a2 is reflected by the main mirror 1, and is directed to a viewfinder system including a pentagonal roof prism 4 and an eyepiece lens 5. During the exposure time shown in FIG. 1(b), both the main mirror 1 and the sub-mirror 2 are retracted from the photographic optical path, and a shutter 6 is controlled to expose a photosensitive member, that is, a film 7.

As shown in FIG. 1(a), the aperture 3a is provided in the bottom wall of the mirror box 3 to direct the light to the focus detection unit 8, and in recent years the photoreceptive surface of the focus detection unit have tended to become larger as the focus detection area in the object field (AF area) has become wider. Accordingly, The aperture provided on the bottom wall of the mirror box has also naturally become larger. This situation is shown in FIGS. 2(a) and 2(b).

Since the focus detection unit 18 in the camera shown in FIGS. 2(a) and 2(b) is overall larger in size compared to the focus detection unit shown in FIGS. 1(a) and 1(b), the bottom side of the camera is increased in size when the distance in the former from the photoreceptive surface 18a to the bottom wall surface 13b of the mirror box is the same distance as in the latter from the photoreceptive surface 8a to the bottom wall surface 3b of the mirror box of FIGS. 1(a) and 1(b). That is, the height dimension of the camera is increased simply by the amount of enlargement of the focus detection unit. In FIGS. 1(a) and 1(b) and FIGS. 2(a) and 2(b), a comparison of the distances h1 and h2 in the respective drawings from the bottom edge of the focus detection unit to the photographic optical axis shows the distance h2 is greater.

In order to prevent such and enlargement of the camera, i.e., increase in height, the position of the focus detection unit is modified as shown in the examples of FIGS. 3(a) and 3(b). In this example, an increase in the camera height dimension is prevented by reducing the distance from the photoreceptive surface 28a of the focus detection unit 28 to the bottom wall surface 23b of the mirror box so as to be shorter than the distances in FIGS. 1(a) through 2(b). In FIGS. 3(a) and 3(b), the distance h3 from the bottom edge of the focus detection unit to the photographic optical axis is shorter than the distance h2 in FIGS. 2(a) and 2(b). In this construction, however, the aperture 23a formed in the bottom wall 23 of the mirror box is larger. Although the aperture 13a of FIGS. 2(a) and 2(b) is larger than the aperture 3a of FIGS. 1(a) and 1(b), the aperture 23a of FIGS. 3(a) and 3(b) is the largest aperture of the three.

Although an increase in the height dimension of the camera while achieving a wider AF area is prevented in the construction shown in FIGS. 3(a) and 3(b), new disadvantages arise as described below. As can be understood from FIG. 3(a), in addition to the aperture 23a on the bottom wall of the mirror box being larger, the photoreceptive surface 28a of the focus detection unit is positioned very close to the bottom wall surface 23b of the mirror box. As a result, the incident light is reflected by the photoreceptive surface 28a of the focus detection unit, and impinges a film 27 and generates a flare, as indicated by the arrow A in FIG. 3(b). The photoreceptive surface 28a of the focus detection unit readily reflects light since it is usually made of a filter or a lens, but naturally cannot be a diffusion surface due to the nature of the photoreceptive surface. In the construction shown in FIGS. 1(a) and 1(b), this problem does not occur because the AF area is narrow and, as a result, the aperture 3a formed on bottom wall of the mirror box is small, and the photoreceptive surface 8a of the focus detection unit is largely indented relative to the bottom wall surface 3b of the mirror box.

SUMMARY OF THE INVENTION

Accordingly, an object of the present invention is to provide a camera which does not generate flare even in a construction in which the focus detection unit is positioned adjacent to a large aperture formed in the wall of a mirror box.

One aspect of the present invention is the provision of a cover to effectively close the aperture during exposure in a camera provided with a focus detection unit disposed so as to a photoreceptive surface adjacent to an aperture provided in the wall of a mirror box.

That is, a main mirror is provided which rotates within the mirror box between a viewing position to reflect toward a viewfinder a part of the light from an object positioned within the photographic optical path and an exposure position retracted from the photographic optical path during exposure, and a sub-mirror is provided which reflects toward the photoreceptive surface of the focus detection unit the light transmitted through the half mirror portion of the main mirror when the main mirror is set at the viewing position and itself retracts from the photographic optical path when the main mirror is retracted to the exposure position. An aperture is formed on the wall of the mirror box to direct the light reflected by the sub-mirror toward the photoreceptive surface of the focus detection unit. A cover is provided to permit the light reflected from the sub-mirror to pass through the aperture when the main mirror is at the viewing position, and to effectively close the aperture in conjunction with the retraction of the main mirror to the exposure position. In this instance, "effective closure of the aperture" includes the meaning that the aperture is closed to the degree that there is no reflection generated to cause flaring at the photoreceptive surface of the focus detection unit positioned within the aperture, even though the aperture is not completely sealed.

Since, in this construction, the aperture which directs light to the focus detection unit is effectively closed in conjunction with the operation to retract the mirror during exposure, the light from an object is not reflected by the photoreceptive surface of the focus detection unit during exposure and does not cause flaring. Accordingly, the enlargement of the photoreceptive surface of the focus detection unit in conjunction with the widening of the AF area does not produce flaring even when the entire focus detection unit is enlarged, and the overall height of the camera is not increased.

It is desirable that the cover is positioned to block the optical path to prevent the incident light entering through the finder system and the half mirror when the main mirror is at the viewing position from directly entering into the focus detection unit. When such a construction is used, light shielding is improved when waiting between photographs and when the camera is not in use.

The surface of the cover on the side exposed to the interior of the mirror box is desirably a light diffusing surface, so as to increase the anti-flaring effectiveness.

These and other objects, advantages and features of the invention will become apparent from the following description thereof taken in conjunction with the accompanying drawings, which illustrate specific embodiments of the invention

BRIEF DESCRIPTION OF THE DRAWINGS

In the following description, like parts are designated by like reference numbers throughout the several drawings.

FIGS. 1(a) and 1(b) are center vertical section views of a conventional single lens reflex camera, FIG. 1(a) shows the focus detection state, and FIG. 1(b) shows the exposure state;

FIGS. 2(a) and 2(b) are center vertical section views of a conventional single lens reflex camera in which a large photoreceptive surface is provided in the focus detection unit, FIG. 2(a) shows the focus detection state, and FIG. 2(b) shows the exposure state;

FIGS. 3(a) and 3(b) are center vertical section views of a conventional single lens reflex camera in which the photoreceptive surface of the focus detection unit is provided adjacent to the bottom wall of the mirror box, FIG. 3(a) shows the focus detection state, and FIG. 3(b) shows the exposure state;

FIG. 4(a) shows the focus detection state, and FIG. 4(b) shows the exposure state;

DETAILED DESCRIPTION OF THE PREFERRED EMBODIMENTS

Figure 4:
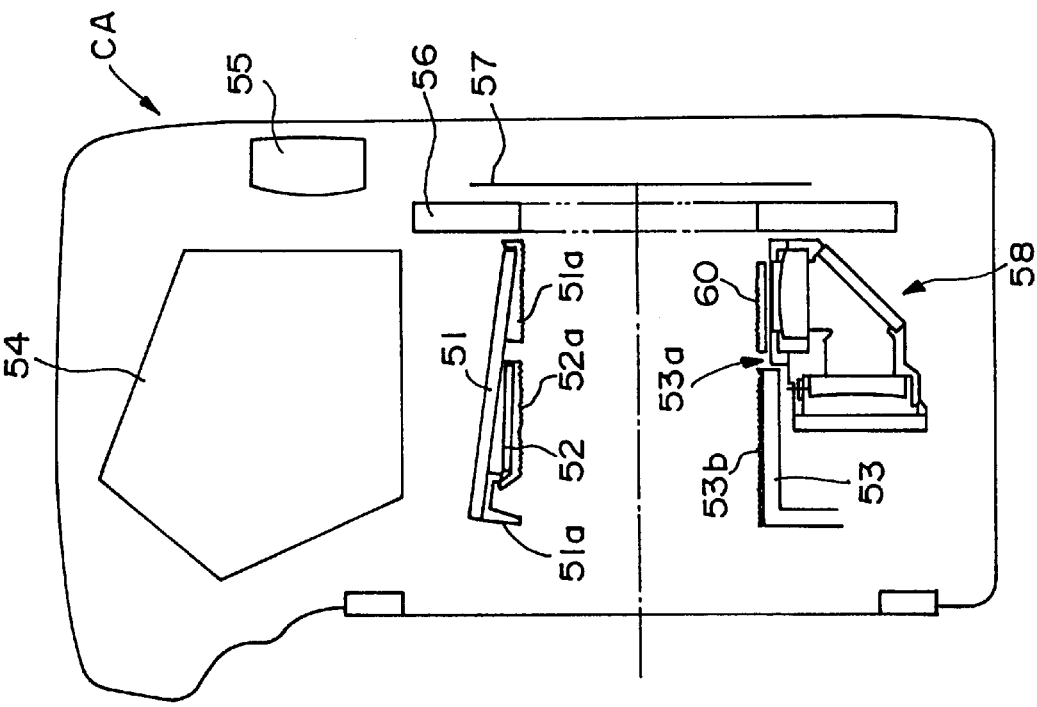
FIGS. 4(a) and 4(b) are center vertical section views of one embodiment of the present invention.
Figure 4:
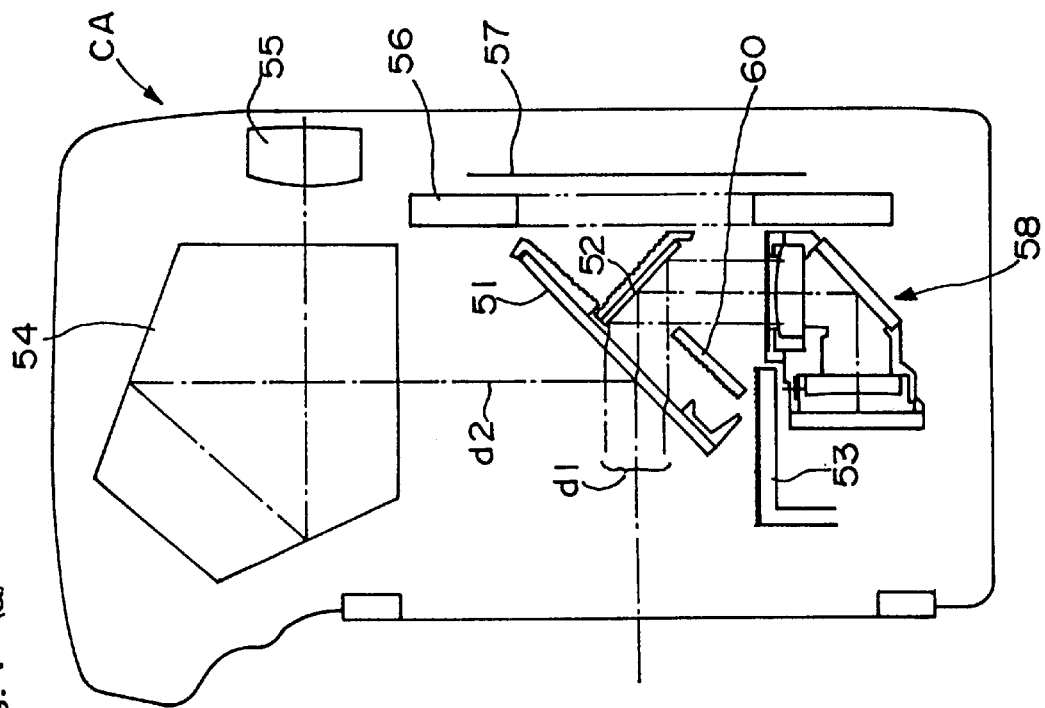

The preferred embodiments of the present invention are described in detail hereinafter with reference to the accompanying drawings. FIGS. 4(a) and 4(b) show a camera CA of one embodiment of the present invention, and the center vertical section views of the camera CA are similar to those shown in FIGS. 1(a) through 3(b). In FIG. 4(a), a main mirror 51 is at the viewing position within the photographic optical path to reflect toward the viewfinder system the viewing light flux d2 which is part of the light from an object, and in FIG. 4(b) the main mirror 51 is retracted to the exposure position outside of the photographic optical path. A sub-mirror 52 reflects toward the photoreceptive surface of the focus detection unit the light flux d1 which is light transmitted through the half mirror portion of the main mirror when the main mirror 51 is at the viewing position, and retracts outside the photographic optical path in conjunction with the retraction of the main mirror 51 to the exposure position.

Separately from the main mirror 51 and the sub-mirror 52, the camera CA is provided with a cover 60 for effectively closing, during exposure, the aperture which directs light to the focus detection unit.

The cover 60 is driven in conjunction with the main mirror 51. The drive mechanism is arranged at the side of the mirror box, and has the construction shown in FIGS. 5(a) and 5(b). This drive mechanism is described below. FIG. 5(a) shows the drive mechanism state corresponding to the main mirror 51 at the viewing position of FIG. 4(a), and the cover 60 is at the open position which permits light from the sub-mirror 52 to reach the focus detection unit 58. FIG. 5(b) shows the drive mechanism state corresponding to the main mirror 51 at the exposure position of FIG. 4(b), and the cover 60 is at the closed position to effectively close the aperture 53a. In FIG. 5, the mirror box and the focus detection unit are omitted.

A mirror drive lever 170 is attached to the mirror box at a rotating shaft 175. The mirror drive lever 170 is forced in a counterclockwise direction toward the position shown in FIG. 5(b) via a mirror drive spring 181, and is stopped at the position shown in FIG. 5(b) by a mirror drive lever stopper not shown in the drawing. One end of the mirror drive spring 181 is connected to a connector 173 provided on the mirror drive lever 170, and the other end of the spring 181 is connected to a connector 190 formed on the camera body.

The mirror drive lever 170 has the dual function of not only driving the main mirror 51, but also driving the cover 60, and, therefore, a main mirror drive mechanism 171 and a cover drive mechanism 172 are provided.

The main mirror 51 is fixedly attached to a main mirror holder 51a (refer to FIG. 4(b)) supported on the mirror box at the rotation shaft 152. That is, the main mirror 51 rotates about the shaft 152.

An overcharge spring 180 is supported by the drive mechanism system by placing a coil 180a around the mirror drive lever rotating shaft 175. One end 180c of the overcharge spring 180 is connected to a connector boss 174 provided on the mirror drive lever 170 and the other end 180b of the spring 180 is connected to a connector boss 151 fixedly attached to the main mirror holder 51a (refer to FIG. 4(b)), so as to exert a downward force. The main mirror 51 is prevented from rotating downward beyond the position shown in FIG. 5(a) by a main mirror stopper not shown in the drawing.

When the shutter 56 is instructed to open, the connection between the mirror drive lever 170 and the mirror drive lever stopper (not shown in the drawing) is released. When the connection is released, the mirror drive lever 170 is tensed by the mirror drive spring 181 so as to be rotated in a counterclockwise direction toward the position shown in FIG. 5(b). At this time, the main mirror drive unit 171 of the mirror drive lever 170 lifts main mirror holder connector boss 151, and as a result the main mirror 51 is rotated to the exposure position or the mirror up position shown in FIG. 5(b). When the main mirror 51 reaches the exposure position, the shutter 56 is opened for a predetermined exposure time to permit light entering onto a photosensitive member, that is, a film 57.

After exposure, the mirror drive lever stopper returns the mirror drive lever 170 to the position shown in FIG. 5(a), at the same time charging the spring 181.

The cover 60 is driven in conjunction with the operation of the main mirror 51 described above. That is, the cover 60 is attached to a cover drive lever 161, and the cover drive lever 161 is attached to the mirror box at a rotating shaft 163, and a connector boss 162 connects the mirror cover lever to the inside of the cover drive notch 172. By means of this connection, the cover drive lever 161 rotates counterclockwise when the mirror drive lever 170 rotates clockwise, so as to move the cover 60 to the open position, and rotates clockwise when the mirror drive lever rotates counterclockwise, so as to move the cover 60 to the closed position. In other words, the cover 60 closes the aperture 53*a* during exposure or the shutter opening time.

Although the mechanism for driving the sub-mirror 52 is omitted from FIGS. 5(*a*) and 5(*b*), the construction of the sub-mirror 51 and the drive mechanism of the sub-mirror 52 are identical to those of a conventional camera. That is, a sub-mirror holder 52*a* is connected via a hinge with the main mirror holder 51*a*, or connected to a rotating shaft independent of the main mirror holder 51*a*, so as to move in conjunction with the main mirror 51 when the sub-mirror 52 moves from the position in FIG. 4(*a*) to the position in FIG. 4(*b*). Accordingly, the sub-mirror 52 and the cover 60 both move in conjunction with the movement of the main mirror 51.

As can be understood from the above description, the aperture in the bottom wall of the mirror box which directs light to the focus detection unit is effectively closed in conjunction with the movement of the mirror during exposure in the camera described above. Accordingly, flaring generated by light reflected by the photoreceptive surface of the focus detection unit does not occur even when the aperture is enlarged in accordance with the enlargement of the photoreceptive surface of the focus detection unit, nor even when the photoreceptive surface of the focus detection unit is disposed adjacent to the aperture to limit the overall height of the camera.

Figure 5:
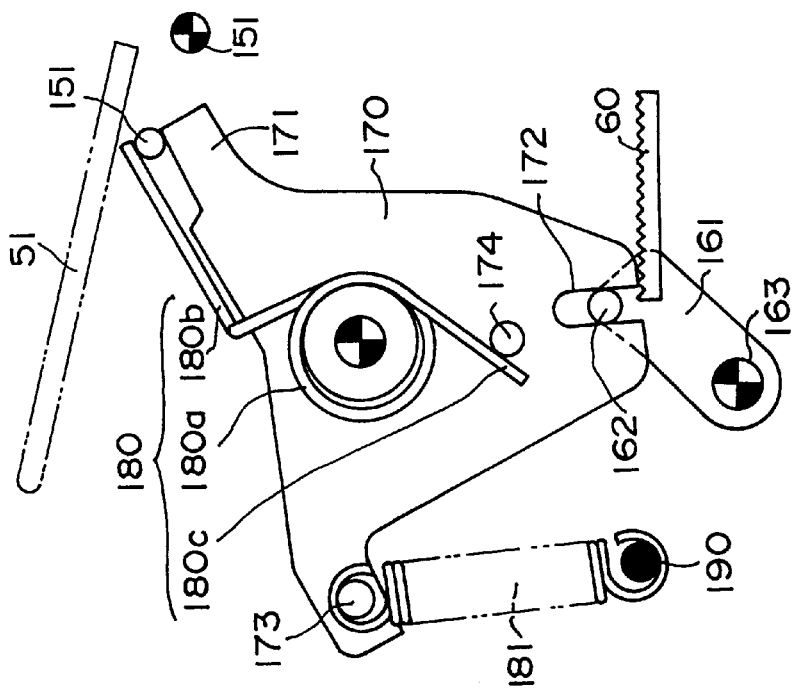
FIGS. 5(a) and 5(b) show the drive mechanisms for the main mirror and the cover in the aforesaid embodiment.
Figure 5:
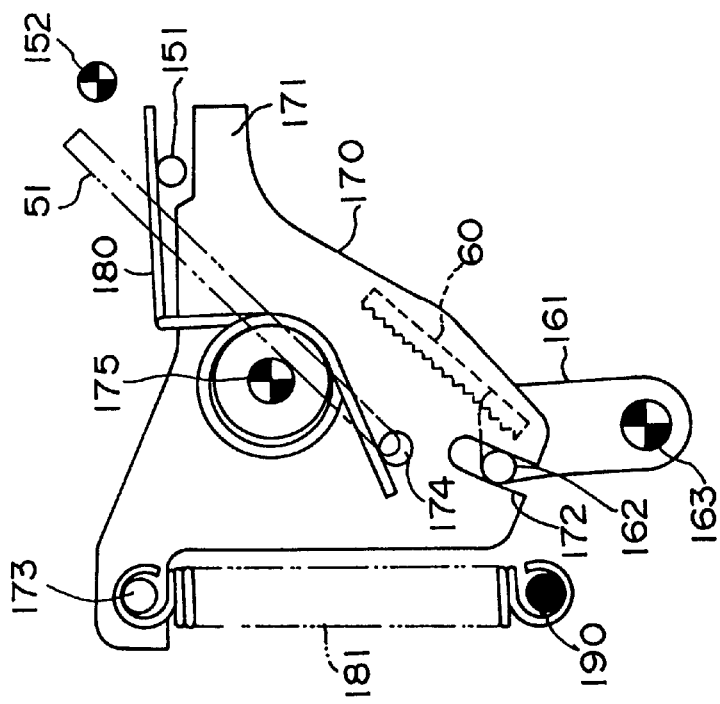

The surface of the cover exposed to the interior of the mirror box when the cover 60 is in the closed position is most advantageously a light diffusing surface similar to the bottom wall surface of the mirror box and the mirror holder surfaces, as shown in FIG. 4(*b*). These light diffusing surfaces may be obtained by forming an array of thin grooves on the component surface, and providing a non-glossing coating.

When the main mirror 51 is in the down position i.e., the viewing position, showing FIGS. 4(*a*) and 5(*a*), the cover 60 is positioned at the bottom edge of the mirror box below the viewfinder optical path near the bottom edge of the main mirror 51. That is, the cover is positioned to block the optical path to prevent the incident light entering through the finder system, the half mirror and the sub-mirror 52 from entering into the focus detection unit. Furthermore, diffusion light is also blocked from passing below the main mirror toward the shutter.

Figure 6:
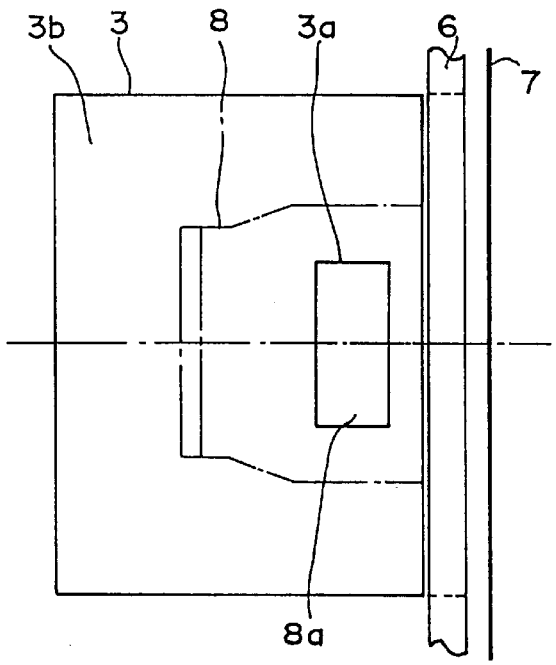
FIG. 6 is a horizontal section view including the photographic optical path in the camera of FIG. 1(a)
Figure 7:
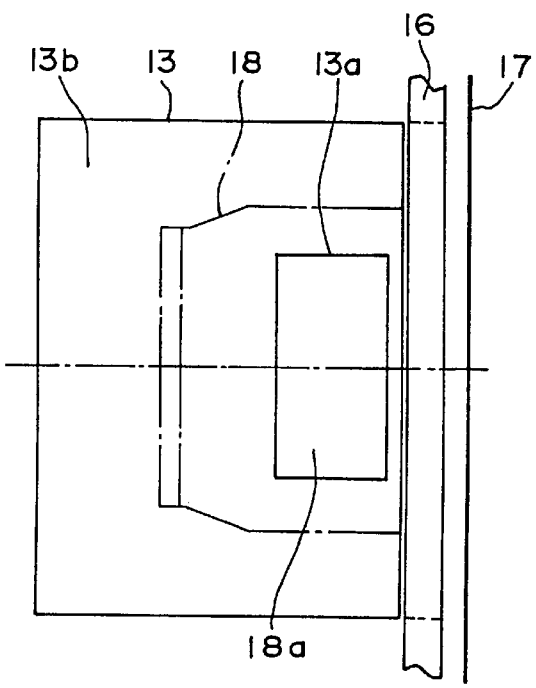
FIG. 7 is a horizontal section view including the photographic optical path in the camera of FIG. 2(a)
Figure 8:
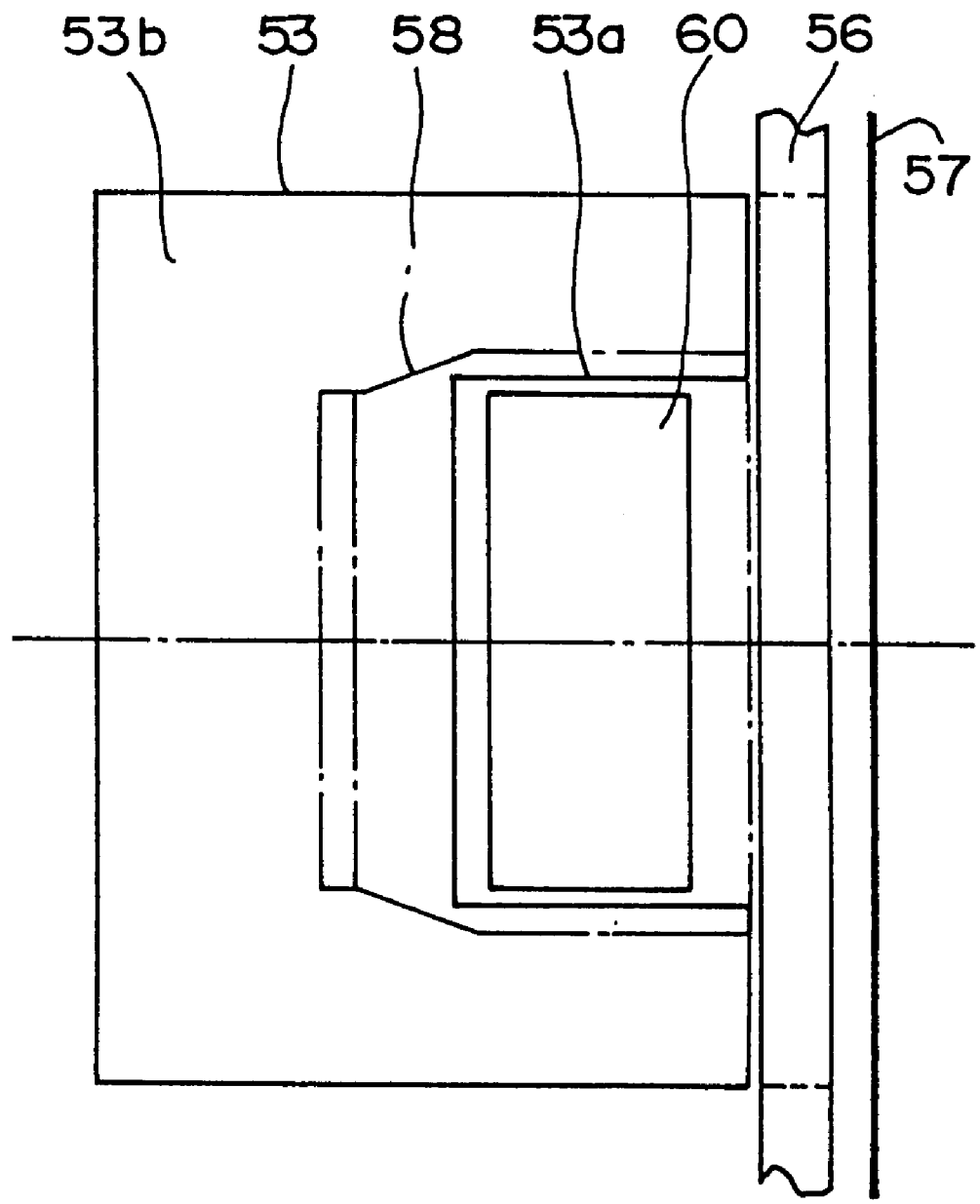
FIG. 8 is a horizontal section view including the photographic optical path in the camera of FIG. 4(a).

FIGS. 6, 7, and 8 are horizontal section views of the cameras including the photographic optical path shown in FIGS. 1(*a*), 2(*a*), and 4(*a*). These drawings compare the focus detection units 8, 128, and 58, and the apertures 3*a*, 13*a*, and 53*a* formed in the bottom wall of the mirror box, and show the sequentially increasing side of the openings of the apertures 3*a*, 13*a*, and 53*a*. The aperture 53*a* is shown effectively closed by the cover 60.

The cover may be driven by a separately dedicated drive unit rather than driven in conjunction with the main mirror. The total surface of the main mirror may be a semitransparent mirror such that the main mirror need not be driven. In such case, the cover is driven in synchronism with the opening of the shutter.

The position of the aperture in the mirror box is optional.

The present invention is applicable not only to a focus detection unit, but also to various other elements provided within an aperture.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A camera comprising:

a mirror box;

a sensor provided in an opening formed on a wall of said mirror box;

a main mirror provided in said mirror box movable between a viewing position within a photographic optical path to reflect towards a viewfinder a part of the light from an object and an exposure position retracted from the photographic optical path during exposure;

a sub-mirror provided behind said main mirror which reflects toward said sensor the light transmitted through said main mirror; and a cover provided to permit the light reflected from the sub-mirror to pass through the opening when the main mirror is at the viewing position, and to effectively close the opening in conjunction with the retraction of the main mirror to the exposure position, wherein said cover is positioned to prevent incident light entering through the viewfinder and the main mirror from entering onto the sensor when said main mirror is at said viewing position.

2. A camera according to claim 1 further comprising a drive member interlocked with said main mirror and said cover so as to retract said main mirror to said exposure position and to cause said cover to close said opening.

3. A camera according to claim 1, wherein said cover has a light diffusion surface on a side facing said sub-mirror.

4. A camera according to claim 1, wherein said sensor is a focus detection sensor.

5. A camera comprising:

a shutter provided in front of a photoreceptive member for prohibiting light from entering onto the photoreceptive member, and which opens to permit light entering onto the photoreceptive member for exposure;

a sensor;

a mirror provided within an optical path of a light from an object to reflect the light toward said sensor; and a cover provided to permit the light reflected from said mirror to enter onto said sensor unless said shutter opens, and to effectively prohibit the light from entering onto said sensor when said shutter opens, wherein said cover is positioned to prevent incident light entering through the viewfinder and a mirror from entering onto the sensor unless said shutter opens.

6. A camera according to claim 5, wherein said cover has a light diffusion surface on a side facing said mirror.

7. A camera according to claim 5, wherein said sensor is a focus detection sensor.

8. A camera comprising:

a sensor;

a mirror provided within an optical path of a light from an object to reflect the light toward said sensor; and a cover separately provided from said mirror which permits the light reflected from said mirror to enter onto said sensor except for the time of exposure, and to effectively prohibit the light from entering onto said sensor during exposure, wherein said cover is positioned to prevent incident light entering through the viewfinder and a mirror from entering onto the sensor except during exposure.

9. A camera according to claim 8, wherein said cover has a light diffusion surface on a side facing said mirror.

10. A camera according to claim 8, wherein said sensor is a focus detection sensor.

* * * * *